Oct. 7, 1941.  W. J. PETERS ET AL  2,258,163
BROACH
Filed Nov. 5, 1938  2 Sheets-Sheet 1

INVENTOR.
William J. Peters
Wayne Pattison
Walter A. Robinette
BY Ramsey, Kent, Chisholm + Lutz
ATTORNEYS.

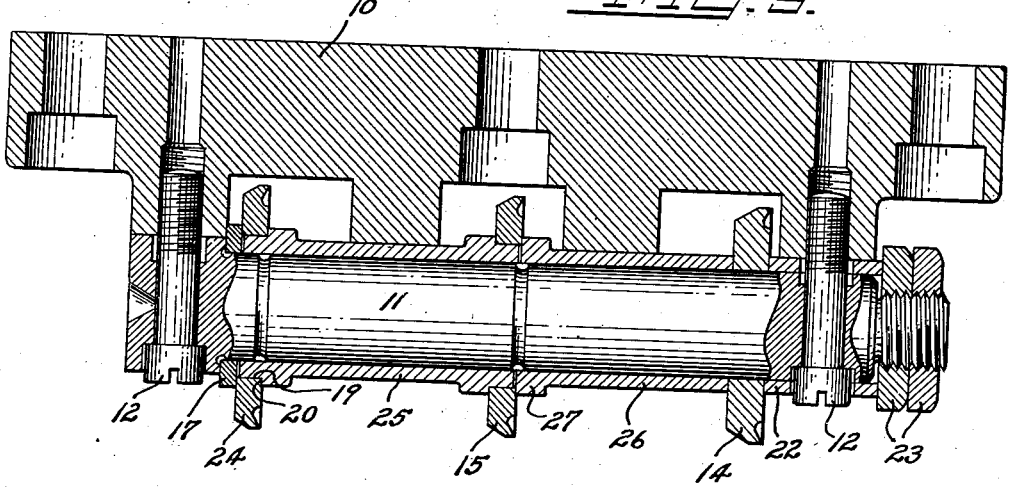
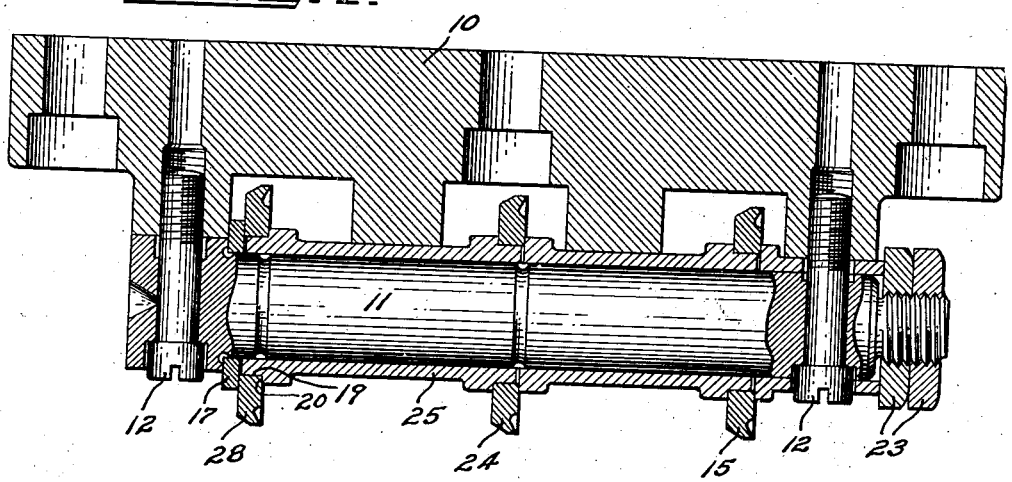

Patented Oct. 7, 1941

2,258,163

UNITED STATES PATENT OFFICE 2,258,163

BROACH

William J. Peters, Wayne Pattison, and Walter A. Robinette, Detroit, Mich.

Application November 5, 1938, Serial No. 239,014

10 Claims. (Cl. 29—95.1)

This invention relates to broaches, particularly to broaches of the type used in finishing bearings for internal combustion engines.

A primary object of the invention is the provision of an improved broach of extremely long life capable of broaching a very large number of bearings without having to be removed for resharpening.

This object is accomplished by forming at least one of the cutter rings of a material containing tungsten carbide, which material is much harder than the best tool steels, and which retains its sharp cutting edge almost indefinitely even when working on relatively hard bearing materials.

The tungsten carbide material is expensive and the invention includes features which economize on the amount of the material required, and which permit interchangeable use of the hard cutter rings with standard cutter rings made of tool steel.

These and other objects of the invention will become apparent as the description proceeds.

While preferred forms are disclosed herein for purposes of illustration, it should be understood that various changes may be made in the structure without departing from the spirit of the invention as herein set forth and claimed.

In the drawings:

Fig. 3 is a view similar to Fig. 1 but showing the arrangement of parts when two of the hard cutter rings are used.

Fig. 4 is a view similar to Fig. 3 illustrating the use of three of the hard cutter rings.

Figure 1:
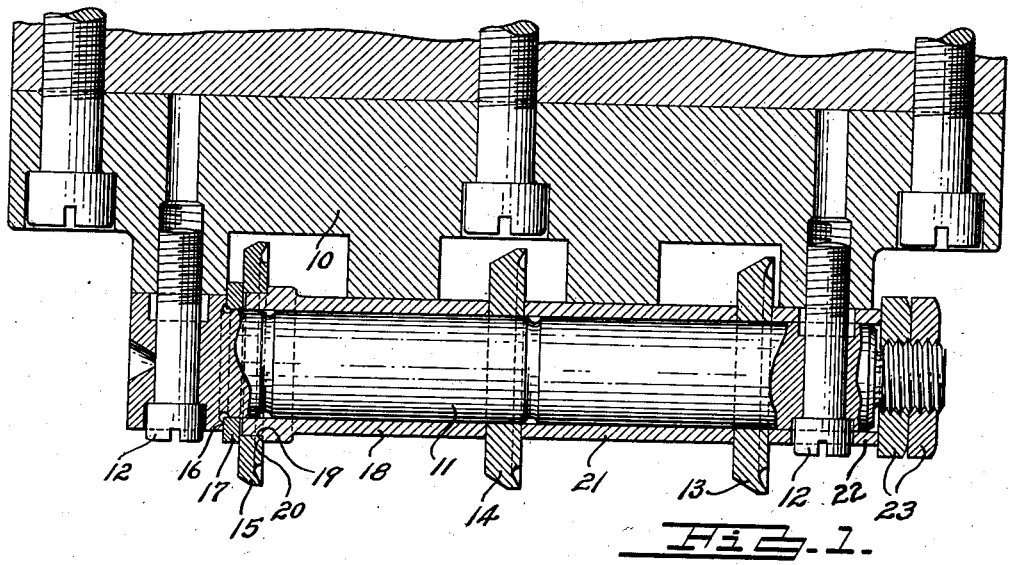
Fig. 1 is a longitudinal section through a broach embodying the invention in which a single hard cutter ring is used.
Figure 2:
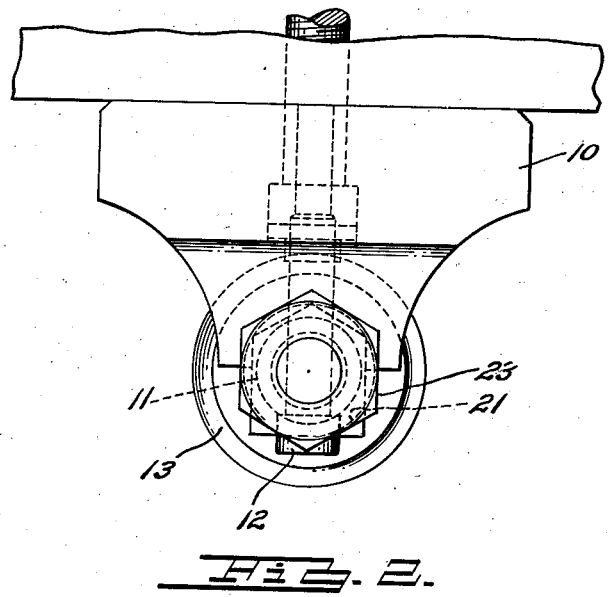
Fig. 2 is an end elevation looking toward the right-hand end of Fig. 1.

Referring to the drawings in greater detail, Fig. 1 illustrates the first stage in the application of the invention to a broaching machine. In this figure 10 represents the broach holder to which an arbor 11 is secured by suitable fastening means 12. 13, 14 and 15 are the cutter rings suitably mounted on arbor 11 in positions spaced apart from each other. In the operation of the machine the cutting stroke takes place in such a way that the cutter ring 13 makes the first roughing cut across the bearing. The cutter ring 14 is of slightly larger outer diameter than the cutter ring 13 and takes the second cut into the bearing. The cutter ring 15 is of slightly larger outer diameter than cutter ring 14 and takes the finishing cut from the bearing. It should be remembered that the cutter rings 13, 14 and 15 take their successive cuts in that order, because the order of cutting has an important bearing on the arrangement of parts as will be subsequently explained.

In broaches of this type as used prior to the present invention, all three of the cutter rings were made from the best available high speed tool steel, and all of them were formed with internal diameters closely fitting over the arbor 11, as illustrated in connection with cutter rings 13 and 14 of Fig. 1.

These broaches are used on the inner surface of semi-cylindrical bearings lined with relatively hard bearing metals, such as bronze or copper-lead alloys. The latter material especially is likely to contain small particles of oxide which are extremely hard and which tend to dull the cutters. When using a broach of the construction previously known, as above described, the cutter rings became dull after operating on a relatively small number of bearings, and very seldom exceeded the finishing of 500 bearings before it was necessary to stop the machine, remove the broach and resharpen the cutter rings. On account of the necessity of finishing the bearings to very close limits (in present practice these limits are plus or minus 0.000125) this resharpening operation either consumed an inordinately large amount of time, or resulted in a high percentage of defective bearings.

According to the present invention one or more of the tool steel cutter rings is replaced by a cutter ring formed of a material much harder than the best available tool steel. At the present time the preferred material is a material sold under the trade-mark "Carboloy" which is composed primarily of cobalt and tungsten carbide. In the form of the invention illustrated in Fig. 1 the finishing cutter is formed of this material, the other cutters being conventional tool steel cutters as formerly used. In view of the high cost of the Carboloy the amount of material in the cutter 15 is kept at a minimum by mounting it upon a sleeve which fits over the arbor 11, thereby reducing the radial width of the cutter ring. As illustrated in the drawings, the Carboloy ring can also be made of a less axial width.

The invention includes features which permit mounting of the specially constructed Carboloy ring on the same arbor with the conventional tool steel rings. As illustrated in Fig. 1 the arbor 11 has a shoulder 16 and a washer 17 is fitted over the arbor into engagement with shoulder 16. A first sleeve 18 fits over the arbor and has an end 19 which fits into Carboloy ring 15 and projects beyond shoulder 20. The length of the end 19 is less than the axial length of ring 15 so that when the parts are assembled ring 15 is clamped between washer 17 and shoulder 20. The second cutting ring 14, which is of the previously known tool steel construction, fits over the arbor 11 and engages the end of sleeve 18. A second sleeve 21 is then placed over the arbor followed by the third cutter ring 13. A third sleeve 22 fits over the outer end of the arbor and suitable clamping nuts 23 are threaded on the end of the arbor and serve to clamp firmly in position all of the parts mounted on arbor 11.

It will be clear to one skilled in the art that the important feature of the construction illustrated in Fig. 1 is the provision of the Carboloy cutter ring 15 which has a larger opening than the prior art cutter rings 13 and 14, and that any preferred mechanical arrangement for mounting cutter ring 15 may be substituted for the arrangement illustrated.

In the operation of the improved broach above described, the Carboloy cutter ring 15 makes the finishing cut on the bearing and since it maintains its accurate sharp edge for a long time, it is found that as many as 100,000 bearings can be finished without having to remove the broach from the machine for resharpening, thus increasing many times the useful life of the broach and materially reducing the cost of finishing bearings.

When the Carboloy cutter ring 15 does finally become dull, it can be sharpened and reduced in diameter to a size making it suitable for use in the second position, as illustrated in Fig. 3. In this arrangement the cutter ring 14 also has been sharpened, has been reduced in diameter, and placed in the third position, while the new Carboloy ring 24 is placed in the first position. In this construction the cutter ring 14 is mounted directly on arbor 11, while rings 15 and 24 are both mounted on suitable sleeves or bushings. In the form illustrated, the sleeve 25 has reduced ends which carry the rings 15 and 24, and a second sleeve 26 has a shoulder 27 which engages ring 15. The assembly is completed by third sleeve 22 and nuts 23 as previously described.

When the broach illustrated in Fig. 3 requires sharpening, the parts may be rearranged as shown in Fig. 4, in which Carboloy ring 15 has been sharpened, reduced in diameter, and placed in the third position; Carboloy ring 24 has been sharpened, reduced in diameter and placed in the second position; and a new Carboloy ring 28 has been placed in the first position. In this arrangement suitable sleeves are provided for mounting all three of the cutter rings on the arbor as will be clear from the previous description.

The broach illustrated in Fig. 1 in which a single Carboloy ring is used in connection with two tool steel rings provides a very satisfactory arrangement, but it will be clear from the above explanation that the arrangement of parts permits successive advance of the Carboloy rings to different positions on the broach as they are reduced in size by successive sharpenings. In the broach constructions illustrated in Figs. 3 and 4 the Carboloy rings in the advanced positions provide additional protection for the Carboloy ring in the first position, and hence will give these broaches even longer life than the one illustrated in Fig. 1.

It will be understood by those skilled in the art that the broach disclosed herein can be turned after a period of use to bring the upper halves of the cutter rings into the lower cutting position, but this feature forms no part of the present invention.

We claim:

1. A broach which comprises an arbor, a pair of tool steel cutter rings, and a cutter ring of harder material which includes tungsten carbide, the hard cutter ring having a larger internal opening than the internal openings of the tool steel rings, and means for rigidly holding said rings in spaced relation on said arbor.

2. A broach which comprises an arbor, a tool steel cutter ring, and a pair of cutter rings of harder material which includes tungsten carbide, both hard cutter rings having internal openings of the same size and larger than the internal opening of the tool steel ring, and means for rigidly holding said rings in spaced relation on said arbor.

3. A broach which comprises an arbor and sleeves and three cutter rings of a hard material which includes tungsten carbide, the cutter rings being mounted on said sleeves, said sleeves holding said rings spaced from each other on said arbor.

4. A broach which comprises a broach holder, an arbor mounted on the broach holder and having a shoulder formed near one end thereof, a washer on the shaft engaging the shoulder, a first sleeve fitting over the arbor, a first cutter ring formed of material including tungsten carbide mounted on one end of the first sleeve, a second cutter ring formed of tool steel mounted directly on the arbor and contacting with the end of the first sleeve, a second sleeve fitting over the arbor and contacting with the second cutter ring, a third cutter ring formed of tool steel mounted directly on the arbor and contacting with the second sleeve, a third sleeve contacting with the third cutter ring, and a nut threaded on the end of the arbor and acting upon the third sleeve to draw all of the parts firmly together.

5. A broach which comprises a broach holder, an arbor mounted on the broach holder and having a shoulder formed near one end thereof, a washer on the shaft engaging the shoulder, a first sleeve fitting over the arbor, a first cutter ring formed of material including tungsten carbide mounted on the first sleeve, a second cutter ring formed of material including tungsten carbide mounted on said first sleeve, means for holding said cutters on said sleeve, a second sleeve fitting over the arbor, a third cutter ring formed of tool steel mounted directly on the arbor and contacting with the second sleeve, a third sleeve contacting with the third cutter ring, and a nut threaded on the end of the arbor and acting upon the third sleeve to draw all of the parts firmly together.

6. A broach which comprises a broach holder, an arbor mounted on the broach holder and having a shoulder formed near one end thereof, a washer on the shaft engaging the shoulder, a first sleeve fitting over the arbor, a first cutter ring formed of material including tungsten carbide mounted on the first sleeve, a second cutter ring formed of material including tungsten carbide mounted on said first sleeve, a second sleeve fitting over the arbor, a third cutter ring formed of material including tungsten carbide mounted on said second sleeve, means for holding said cutters on said sleeves, a third sleeve fitting over the arbor, and a nut threaded on the end of the arbor and acting upon the third sleeve to draw all of the parts firmly together.

7. In a broach having an arbor, a sleeve fitting over the arbor, a plurality of cutter rings, means for maintaining said cutter rings in spaced relation, the cutter rings which take the first and second cuts being mounted directly on the arbor, and the cutter ring which takes the finishing cut being mounted on said sleeve.

8. In a broach having an arbor, a sleeve fitting over the arbor, a plurality of cutter rings, means for maintaining said cutter rings in spaced relation, the cutter ring which takes the first cut being mounted directly on the arbor, and each of the cutter rings which take the second and third cuts being mounted on said sleeve.

9. A broach which comprises a broach holder, an arbor mounted on the broach holder and having a shoulder formed near one end thereof, a washer on the shaft engaging the shoulder, a first sleeve fitting over the arbor, a first cutter ring mounted on the first sleeve, a second cutter ring mounted on said first sleeve, a second sleeve fitting over the arbor, a third cutter ring mounted on said second sleeve, means for fitting said cutters on said sleeves, a third sleeve fitting over the arbor, and a nut threaded on the end of the arbor and acting upon the third sleeve to draw all of the parts firmly together.

10. In a broach having an arbor, a sleeve fitting over the arbor, a plurality of cutter rings supported by the arbor, means for maintaining said cutter rings in spaced relation, at least one of said cutter rings being mounted on said sleeve.

WILLIAM J. PETERS.
WAYNE PATTISON.
WALTER A. ROBINETTE.